United States Patent [19]
Jones

[11] Patent Number: 5,579,314
[45] Date of Patent: Nov. 26, 1996

[54] CONNECTIONLESS INFORMATION SERVICE DELIVERY

[75] Inventor: Keith P. Jones, Warwickshire, United Kingdom

[73] Assignee: GPT Limited, United Kingdom

[21] Appl. No.: 431,786

[22] Filed: May 1, 1995

[30] Foreign Application Priority Data

May 4, 1994 [GB] United Kingdom ............ 9408798

[51] Int. Cl.⁶ .................................................. H04Q 1/30
[52] U.S. Cl. ................................. 370/68.1; 379/126
[58] Field of Search .......................... 379/22, 23, 27, 379/31, 111, 113, 114, 121, 126; 370/68.1, 76, 110.1

[56] References Cited

U.S. PATENT DOCUMENTS 5,187,710  2/1993  Chau et al. ...................... 379/126
5,357,508  10/1994  Le Boudec et al. ............... 370/68.1

*Primary Examiner*—Benedict V. Safourek
*Attorney, Agent, or Firm*—Kirschstein, et al.

[57] ABSTRACT

A telecommunications system has subscriber and/or private automatic branch exchange accesses, an access signalling system, and a connectionless network signalling system. The telecommunications system employs a connectionless signalling interworking unit for controlling the access signalling system remotely from the accesses. The unit is operative for interworking the network signalling system and the access signalling system. The unit includes a transaction control and transaction monitoring function for passing information bi-directionally between network points without establishing a bearer connection between the network points.

4 Claims, 1 Drawing Sheet

CONNECTIONLESS INFORMATION SERVICE DELIVERY

BACKGROUND OF THE INVENTION

Field of the Invention

In a telecommunications system having subscriber access and connectionless network signalling, an interworking unit is proposed that facilitates the remote control of the access signalling. This is particularly suitable for information services which do not require a bearer connection. This concept is applicable to Intelligent Networks (IN), Integrated Services Digital Network (ISDN), Broadband ISDN and to the emerging Telecommunications Information Network Architecture (TINA).

Currently telecommunications systems provide a mixture of switch-based services and Intelligent Network (IN) based services, where the IN based services are typified by the service delivered within the bearer connection, i.e. a bearer is always required in order to deliver an IN service, e.g. for voice applications. Switched-based services are constrained by their implementation and the host switching platforms capabilities but do exhibit characteristics of control over the access signalling and hence are capable of limited information carriage prior to bearer establishment. However, bearer establishment is always a pre-requisite for switched-based analogue access service information transfer. That is, the telecommunications system itself presents an obstacle to the remote control of access signalling. This restricts the usability of switch-based services.

For Integrated Services Digital Network (ISDN) accesses there exists the concept of the user-to-user information service which can be independent of the B-channel, i.e. via the D-channel. However, there are currently relatively few ISDN Customer Premises Equipment (CPE) existing, compared to analogue CPEs.

Bell Communications Research (Bellcore) have tackled the inflexibility of analogue CPEs by their proposed Advanced Call Management Services (ACMS) Analogue Display Services Interface (ADSI) protocol to improve the subscriber (user) interface.

In order to build on the flexibility that the IN concept provides for rapid service creation, service deployment and customisation of services it is proposed to extend IN control to cover all types of access signalling, i.e. to effectively remove the obstacle of inflexible local access control. The key benefit that this proposal provides is flexibility of control over the usability of services, i.e. the 'look and feel' of the service becomes easy to customise. Control of access signalling can then be remote from the accesses, e.g. for IN the control could be centralised.

SUMMARY OF THE INVENTION

According to the present invention there is provided a telecommunications system having subscriber and/or Private Automatic Branch Exchange (PABX) accesses and connectionless network signalling, wherein the access signalling is controlled remotely using a Connectionless Signalling Interworking Unit which interworks the network and access signalling systems by providing a transaction control and monitoring function whereby information is passed in either direction without establishment of a bearer connection.

BRIEF DESCRIPTION OF THE DRAWINGS

The present invention will now be described by way of example, with reference to the accompanying drawings, in which.

DESCRIPTION OF THE PREFERRED EMBODIMENT

The proposal is that each telecommunications system of a telecommunications network having subscriber accesses be equipped with a Connectionless Signalling Interworking Unit (CSIU). The function of the CSIU is to interwork the network and access signalling systems by providing a transaction control and monitoring function (which is akin to the traditional call control function when bearer connections are considered) so that information may be passed in either direction without the pre-requisite of a bearer connection. This proposal does not preclude bi-directional information transfer in the presence of a bearer connection. This proposal is also applicable to Private Automatic Branch Exchange (PABX) access signalling.

The possibility of deployment of information based services is realised by this proposal, i.e. providing information to subscribers or gathering information from subscribers irrespective of the presence of a bearer connection.

Figure 1:
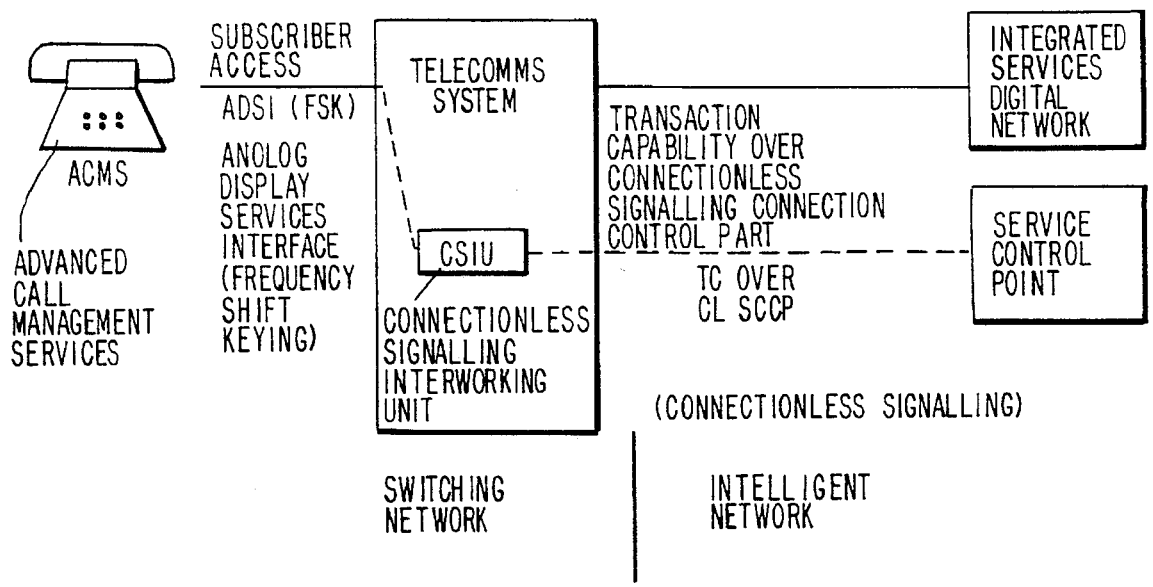
FIG. 1 is a schematic diagram of a Connectionless Signalling Interworking Unit.

A CSIU is shown by example in FIG. 1. This could be considered as a subsystem of a telecommunications system.

Figure 2:
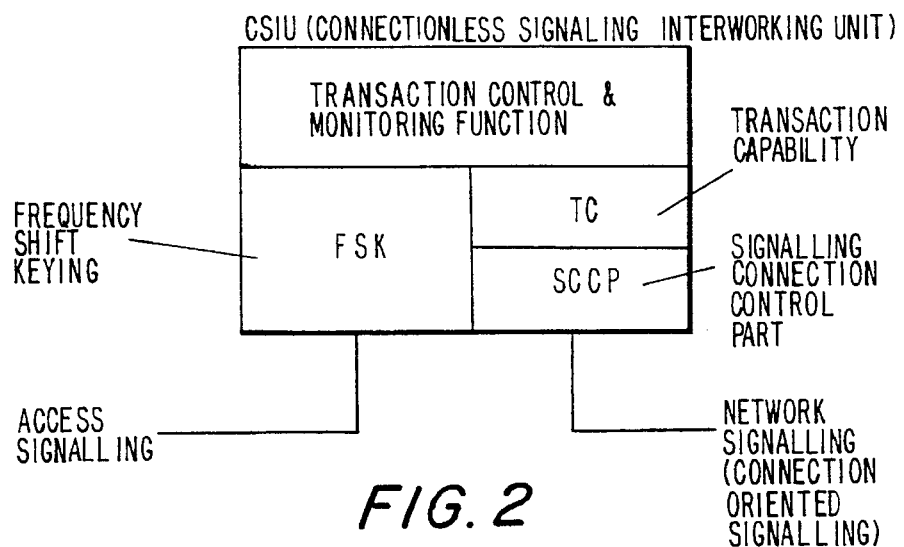
FIG. 2 is a block diagram illustration the functions of a Connectionless Signalling Interworking Unit.

A service which utilises a specific CSIU could be the control by the IN of a Bellcore ACMS telephone. In this example the IN connectionless signalling would utilise International Consultative Committee for Telecommunication and Telegraphy (CCITT) Number 7 signalling Transaction Capability (TC) Recommendations Q.771–775 conveyed via the Signalling Connection Control Part (SCCP) Recommendation Q.771–716 class 1 connectionless (CL) service, as illustrated by FIG. 2. The CSIU would perform a Transaction Control and Monitoring function and perform interworking to the Bellcore Analogue Display Subscriber Interface (ADSI) protocol. The CSIU would pass on the information as FSK (Frequency Shift Keying), in this example, i.e. to display some information (say Advice of Charge). Any FSK response from the ACMS telephone (say statement of bill request) would then be converted by the CSIU to TC and returned to the IN over SCCP.

When the CSIU is activated the particular subscriber access is made 'busy' from the network perspective by informing the telecommunications system call processing function of this instance of an information service. In this example a 'local' bearer connection is required to be established by call processing within the telecommunications system to connect the CSIU to the subscribers access, in order that the FSK may be conveyed between the CSIU and the access. The subscribers ACMS telephone may remain 'on-hook' because the ACMS uses the Bellcore Analogue Display Subscriber Interface (ADSI).

I claim:

1. A telecommunications system having subscriber and/or private automatic branch exchange accesses, an access signalling system, and a connectionless network signalling system, said telecommunications system comprising:

a connectionless signalling interworking unit for controlling the access signalling system remotely from said accesses, and operative for interworking the network signalling system and the access signalling system, said unit including a transaction control and transaction monitoring means for passing information bi-directionally between network points without establishing a bearer connection between the network points.

2. The telecommunications system as claimed in claim 1, wherein the telecommunications system is part of an Intelligent Network.

3. The telecommunications system as claimed in claim 1, wherein the telecommunications system is part of an Information Network.

4. The telecommunications system as claimed in claim 3, wherein the telecommunications system is part of a Broadband Integrated Services Digital Network.

* * * * *